INVENTOR.
O. E. LARSEN

INVENTOR.
O. E. LARSEN

United States Patent Office 3,266,097
Patented August 16, 1966

3,266,097
EXTRUSION APPARATUS
Olaf E. Larsen, Bartlesville, Okla., assignor to Phillips Petroleum Company, a corporation of Delaware
Filed Aug. 13, 1964, Ser. No. 389,348
4 Claims. (Cl. 18—30)

This invention relates to extrusion apparatus. In one aspect, the invention relates to plasticizing means for preparing a plastic mass for extrusion. In another aspect the invention relates to improved extrusion apparatus.

Extrusion is a frequently used technique for producing elongated profile shapes. It is often used, for example, in the production of pipe or tubing or other cross sectional configurations from thermoplastic materials such as nylon, polyvinyl acetate, polyvinyl chloride, and polyolefins, for example, polyethylene, polypropylene, and copolymers of these or other polyolefins or mixtures of two or more materials. The extrusion procedure includes plasticizing, forming and setting.

An object of my invention is to produce accurately sized and shaped and smooth sufraced extruded products.

Another object of my invention is to provide homogeneous plasticized plastic masses for extrusion.

Another object of my invention is to provide simultaneous flow control and plasticization and dispersing of plastic masses for extrusion.

Another object of my invention is to provided improved extrusion apparatus.

Other objects, aspects and the advantages of my invention are apparent in the written description, the drawing and the claims.

According to my invention, there is provided apparatus for plasticizing and preparing a plastic mass for extrusion which comprises a body having an elongated opening therethrough and a dispersion mandrel in the opening, the mandrel comprising a core which is positioned in the opening to form an annular passage between the core and the body and is provided with a plurality of circumferentially spaced teeth which extend outwardly into the annular passage. Each of the teeth is inclined in the direction of flow of the plastic mass through the apparatus from the core toward the body. That is, the outer ends of the teeth are displaced in the direction of flow from the roots of the teeth. I have found that it is advantageous that the spacing between the teeth and the spacing between the outer edges of the teeth and the wall of the body, advantageously are reduced as the teeth traverse the core in the direction of flow therethrough. That is to say, with the teeth positioned in rows, the spacing between teeth is smaller in downstream rows. Where the teeth are placed in two rows, the spacing in the downstream row is smaller than in the upstream row. Where there are a plurality of rows, the spacing between the teeth can be reduced in each row or can be reduced in groups of rows. For example, with two groups of rows, the spacing in the downstream group is smaller than the spacing in the upstream group. The spacing between the outer edges of the teeth and the wall of the body is substantially the same as the spacing between the teeth in any given row.

Preferably the teeth are made in the form of a parallelogram in radial cross section, with the parallelogram inclined forwardly in the direction of flow of the plastic mass through the plasticizing apparatus. Further it is preferable that the upper upstream edge of the tooth is positioned substantially in a radial line through the intersection of the line of zero tensile stress through the tooth and the central core. This configuration of tooth is advantageous in that, as an extremely large force is applied on the tooth by the flow of plastic thereby, there is no tendency to change the spacing between the edge of the tooth and the body wall. If the tooth is made vertically, that is with the upstream edge of the tooth a substantial distance behind, that is upstream, of the line of zero tensile stress, there is a tendency, wherein the force is applied, to cause the upstream edge of the tooth to be lifted as the entire tooth attempts to rotate about the line of zero stress. On the other hand, when the tooth is made with the upstream edge a substantial distance forward of the line of zero tensile stress, there is a tendency for the upstream edge and the entire upper surface of the tooth to increase the spacing from the body wall as the pressure is applied, thus increasing the space through which the plastic can flow.

It is preferable that the spacing between teeth and the spacing between the teeth and the body be substantially uniform at a given row so that any particle of the plastic mass which is unmelted will be smaller than a given size as its passes that particular row. It will be seen that as the plastic mass proceeds through the plasticizing apparatus, smaller particles can pass rows where the spacing between rows and between the teeth and the body is smaller. Thus, there is a gradual reduction in the size of particles as the mass flows through the plasticizing apparatus.

Further according to my invention, there is provided a dynamic extrusion apparatus comprising a long land die, a reciprocating plunger to force the plastic melt into the die and means to provide a smoothly decreasing temperature gradient along the die to solidify the melt prior to removal from the die, and a plasticizing apparatus between the reciprocating plunger and the long land die, the plasticizing apparatus comprising a body with an elongated opening therethrough and a mandrel in the opening forming an annular passage in the opening and being provided with a plurality of teeth extending substantially through the annular passage, the teeth being inclined in the direction of flow of the plastic mass therethrough.

Figure 1:
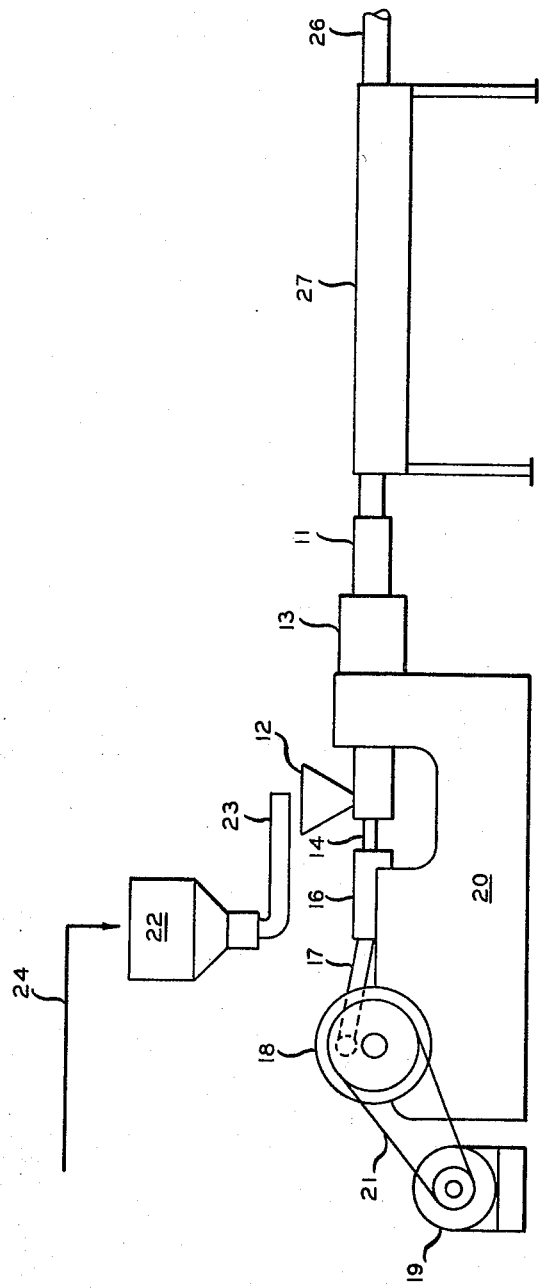
FIGURE 1 is an elevation, partly diagrammatic, of an extruder embodying the present invention.

Referring to FIGURE 1, the extrusion apparatus comprises a long land die 11, a feed hopper 12, a plasticizing and flow control means 13, a plunger 14 attached to cross head 16, a connecting rod 17, a fly wheel 18, driven by motor 19 by means of belt 21. The entire extrusion apparatus is supported on a base 20. A supply hopper 22 and a proportioning feeder 23 supply pellets of extrudable thermoplastic to feed hopper 12, the plastic being supplied to hopper 22 from a suitable source such as indicated diagrammatically by the line 24. The extrudate is illustrated by the elongated portion 26. The diagrammatic representation 27 represents other suitable apparatus such as water colors, brakes, supports, etc.

Figure 2:
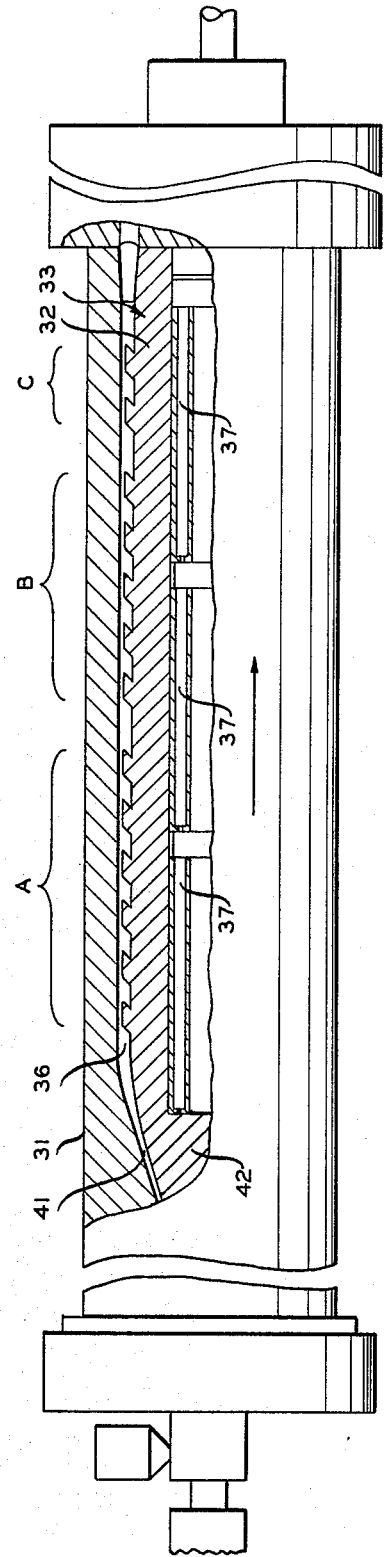
FIGURE 2 is a cross section of plasticizing means.

As illustrated in FIGURE 2, the plasticizing means comprises a body 31 and a dispersion mandrel 32. Dispersion mandrel 32 comprises a central core 33 and a plurality of teeth 34. It is seen that core 33 and body 31, together define an annular passageway 6. Teeth 34 extend outwardly from core 33 into annular passageway 36. Teeth 34 are inclined in the direction of flow through the apparatus, the flow being from left to right in the direction of the arrow as illustrated in FIGURE 2. There are illustrated in FIGURE 2 a plurality of heaters 37 such as electrical cartridge heaters, in the interior of core 33. Heaters can also be provided on the exterior of body 31 or imbedded in body 31. Other heating means such as conduits for circulation of heated fluids or dielectric heating, etc., can be utilized.

Figure 3:
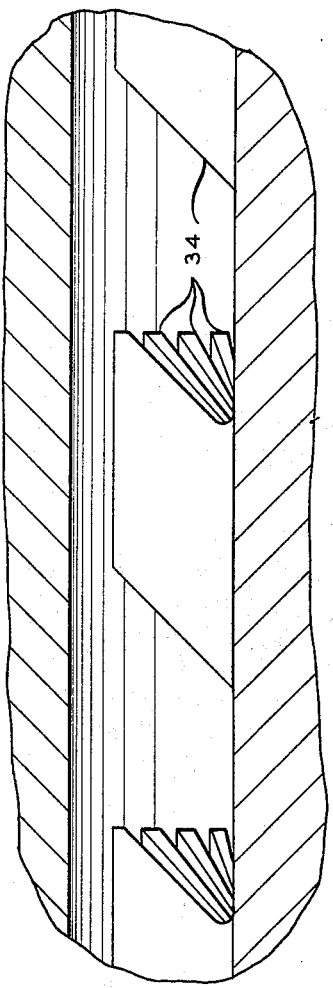
FIGURE 3 is a detail of the teeth in the annular passage of the plasticizing means of FIGURE 2.
Figure 4:
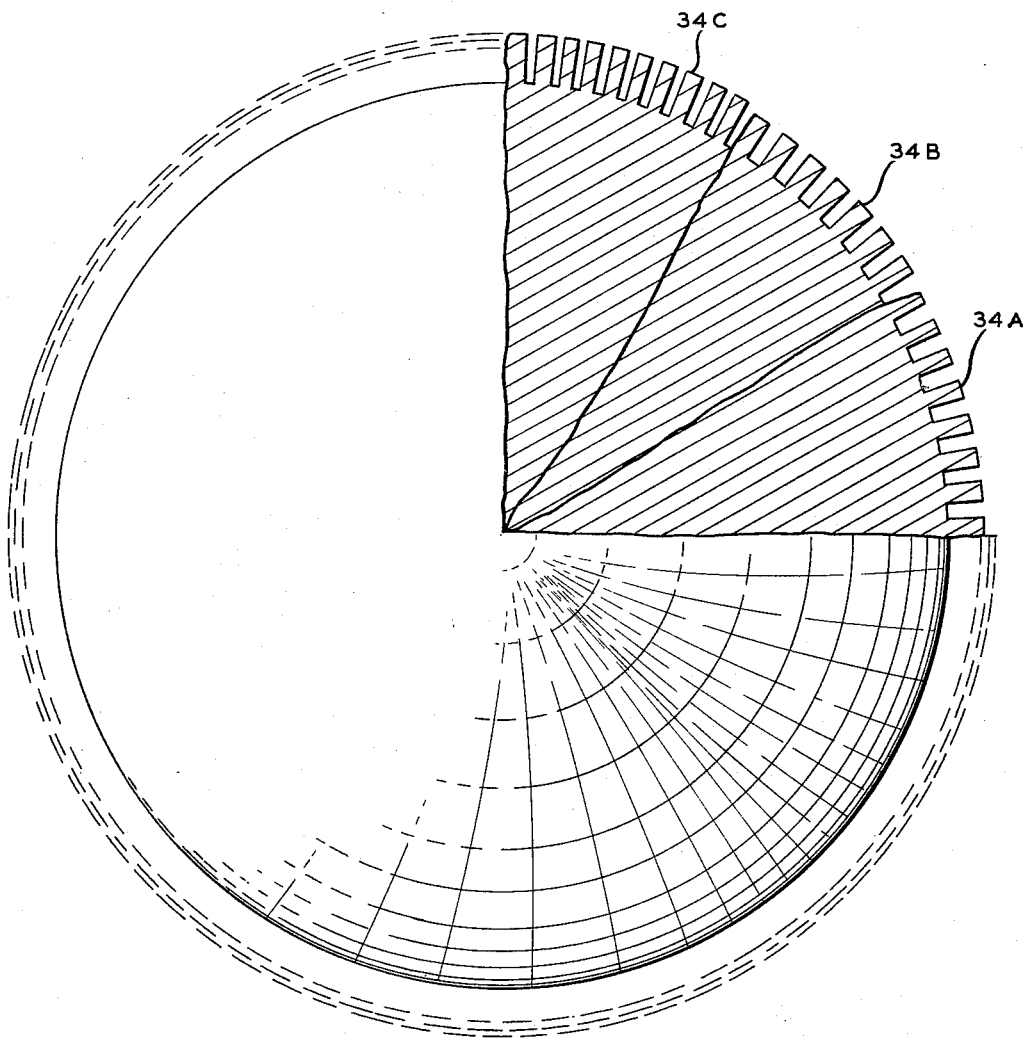
FIGURE 4 shows a flow control and dispersion mandrel for use in the plasticizing means of an extrusion apparatus.

The configuration of teeth 34 can be seen also in FIGURES 3 and 4. As shown in these figures, the teeth are spaced circumferentially around the core 33 and are arranged in rows, the rows being spaced longitudinally along core 33. In the apparatus pictured in FIGURE 2, the rows are arranged in three groups, A, B and C. The spacing between the teeth and the spacing between the outer edges of the teeth and the inner wall of body 31 vary as can be seen clearly in FIGURE 4. The teeth of the rows of Group A, teeth 34A, are spaced farther apart and farther from the wall of body 31 than are the teeth of the rows of Group B, teeth 34B, and teeth 34B are in turn spaced farther apart and farther from the wall of body 31 than the teeth of Group C, teeth 34C.

Flow control means also are provided, as illustrated in FIGURE 2 and FIGURE 4. The flow control means illustrated include a portion of body 31 wherein the opening therethrough is tapered to provide a conical portion 41. A generally conical flow control mandrel 42 is positioned in conical portion 41. As indicated in the cross section of FIGURE 2, the cross sectional area increases in the direction of flow therethrough, thus preventing undesirable backflow of the plastic material therethrough.

It will be recognized that all of the drawings are somewhat schematic in nature and the details of construction unnecessary to a complete understanding of the invention have been eliminated for clarity of illustration. For example, in FIGURE 2, the mandrel 23 and/or body 33 can be made in two or more parts, attached together for example by threaded sections or bolts or other conventional fastening means to facilitate construction and assembly. Any suitable material can be utilized, such as stainless steel.

Further details of dynamic extrusion are set forth in my copending application Serial No. 157,992, filed December 8, 1961. In dynamic extrusion, the length of the long land die generally is in the range of 10 to 100 times the thickness of the profile, preferably in the range of 20 to 60 times. Means to orient the extrudate such as a sizing horn and means to draw the extrudate over the horn can be used therewith. Various forms of plunger means can be used, such as a two-part plunger mechanism, including a first plunger, means to reciprocate it, and a second plunger actuated by a lost motion connection with the means to reciprocate the first plunger. Dynamic extrusion apparatus is suitable not only for extruding various sections such as pipes, rods, and irregular cross sections, but also for coating wires, cables, tubes, etc.

Reasonable variation and modification are possible within the scope of my invention which sets forth apparatus for preparing plastic masses for extrusion and for extruding a thermoplastic material.

I claim:

1. Plasticizing means for preparing a plastic mass for extrusion, comprising:
    a body having an elongated, generally circular cross section opening therethrough; and
    a dispersion mandrel in said opening, said mandrel comprising a central core forming an annular passage in said opening between said body and said core, and a plurality of teeth circumferentially spaced on said core and extending outwardly therefrom substantially through said annular passage, each of said teeth being inclined from said core toward said body in the direction of flow of said plastic mass therethrough, said teeth being positioned in at least two transverse rows spaced longitudinally along said core, an upstream row and a downstream row, the circumferential spacing between teeth being smaller in said downstream row than in said upstream row.

2. Plasticizing means for preparing a plastic mass for extrusion, comprising:
    a body having an elongated, generally circular cross section opening therethrough; and
    a dispersion mandrel in said opening, said mandrel comprising a central core forming an annular passage in said opening between said body and said core, and a plurality of teeth circumferentially spaced on said core and extending outwardly therefrom substantially through said annular passageway, each of said teeth being inclined from said core toward said body in the direction of flow of said plastic mass therethrough, each tooth having the form of a parallelogram in radial cross section, the parallelogram being inclined forwardly in the direction of flow of said plastic mass through said body, the upper upstream edge of said tooth being positioned substantially in radial line through the intersection of the line of zero tensile stress through said tooth and said central core.

3. Plasticizing means for preparing a plastic mass for extrusion, comprising:
    a body having an elongated, generally circular cross section opening therethrough; and
    a dispersion mandrel in said opening, said mandrel comprising a central core forming an annular passage in said opening between said body and said core, and a plurality of teeth circumferentially spaced on said core and extending outwardly therefrom substantially through said annular passage, each of said teeth being inclined from said core toward said body in the direction of flow of said plastic mass therethrough, said teeth being positioned in at least two groups with at least two rows in each group, said groups being spaced longitudinally along said core, an upstream group and a downstream group, the circumferential spacing between teeth in rows being smaller in said downstream group than in said upstream group.

4. In a dynamic extrusion apparatus comprising a long land die, a reciprocating plunger to force a plastic melt into said die and means to provide a smoothly decreasing temperature gradient along said die to solidify said melt prior to removal from said die, the improvement which comprises:
    plasticizing and flow control means for preparing a plastic mass for extrusion and controlling the flow thereof, comprising a body having a generally conical opening and an adjacent generally cylindrical opening downstream of said conical opening in the direction of flow of said plastic mass therethrough;
    a flow control means in said conical section, said flow control mandrel comprising a generally conical core providing an annular passageway between said core and said body, said annular passageway increasing in cross sectional area along said flow control means in the direction of flow therethrough; and
    a dispersion means in said generally cylindrical opening, said dispersion means comprising a central core forming an annular passage in said generally cylindrical opening between said body and said core, and a plurality of teeth circumferentially spaced on said core and extending outwardly therefrom substantially through said annular passage, each of said teeth being inclined from said core toward said body in the direction of flow of said plastic mass therethrough.

References Cited by the Examiner

UNITED STATES PATENTS

| 2,482,243 | 9/1949 | Burnham | 18—30 |
| 2,779,972 | 2/1957 | Kins | 18—30 |
| 2,913,763 | 11/1959 | Longstreth et al. | 25—17 X |
| 3,045,283 | 7/1962 | Keiser. | |

WILLIAM J. STEPHENSON, *Primary Examiner.*